Jan. 7, 1930.   H. WARMAN   1,742,886
DRAIN PAN
Filed Aug. 22, 1928
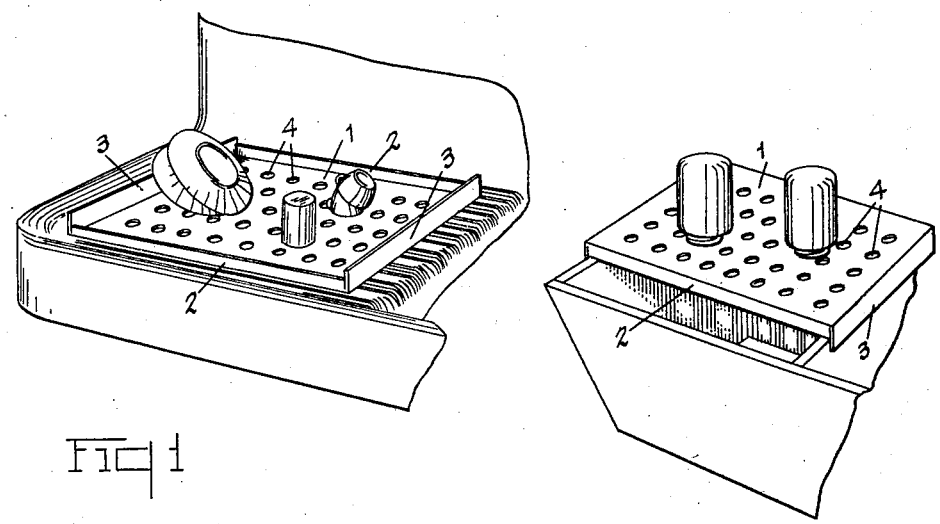
Fig 1
Fig 2
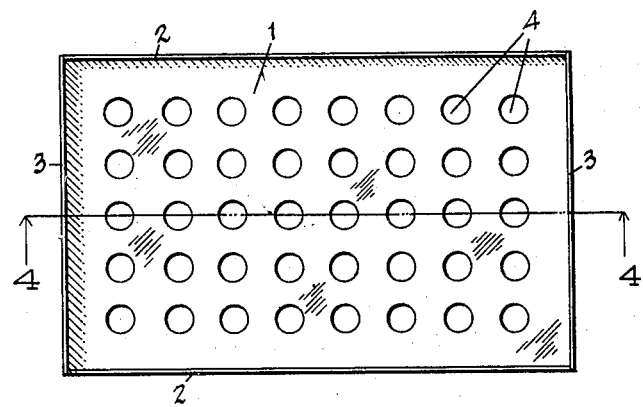
Fig 3
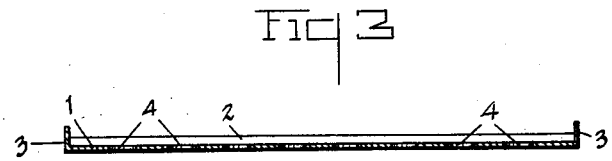
Fig 4
Inventor
Harry Warman
By Faust F. Crampton
Attorney Patented Jan. 7, 1930

1,742,886

UNITED STATES PATENT OFFICE

HARRY WARMAN, OF CLYDE, OHIO, ASSIGNOR TO THE VITRIFIED IRON PRODUCTS COMPANY, OF CLYDE, OHIO, A CORPORATION OF OHIO

DRAIN PAN

Application filed August 22, 1928. Serial No. 301,230.

My invention has for its object to provide a drain pan for draining fluids from articles. The invention particularly has for its object to provide a convenient pan whereby articles that have been saturated or covered with a liquid may be readily placed on the pan and supported in position for rapid removal of the liquid, the pan being so constructed that it may be located on a support that will carry away the liquid that is drained from the articles placed on the pan. The invention provides an exceedingly efficient construction that may be made at a low cost of production and one that is exceedingly convenient and handy for use, particularly for domestic purposes.

The invention may be contained in pans that vary in their details of construction, and, to illustrate a practical application of the invention, I have selected a pan that embodies the invention as an example of the various forms of pans that contain the invention. The particular pan referred to is shown in the accompanying drawing.

Fig. 1 is a perspective view of the pan wherein the pan is shown in one position for containing articles, such as dishes. Fig. 2 is a perspective view of the pan shown inverted. Fig. 3 is a top view of the pan. Fig. 4 is a view of a section taken on the plane of the line 4—4 indicated in Fig. 3.

The pan is formed from sheet metal having end and side portions that are bent to form flanges that extend away from the same side of the pan, such as the flanges 2, which are formed from the side edge portions of the sheet metal and the flanges 3 are formed from the edge portions of the ends of the sheet metal from which the pan is formed. The flanges 3 are, preferably, formed wider than the flanges 2 so that when the pan is inverted, as shown in Fig. 2, and rests on a plane surface, the flanges 2 will be supported above the supporting plane surface and enable the movement of the water or other liquid from beneath the pan. Also, the flanges 3 may be used for securing the pan from being moved endwise where the pan is supported by locating the edges 2 on cross members, such as shown in Fig. 2.

The pan is provided with a plurality of openings 4, having a diameter, preferably, that is large enough to receive the necks of bottles so that the bottles may be inverted when they have been washed. The pan may thus be used as a drain pan for draining the interior of the bottles as well as the exterior. The openings 4 may, moreover, provide for the removal of the water or other liquid from the side of the pan on which the articles are located, and, hence, the water will immediately flow away as it drains from the articles. The pan is, preferably, coated by the well known vitrified enamel to prevent rusting and to give it an attractive appearance.

I claim:

An oblong drain pan formed of sheet metal and having flanges located on one side along its end edges and along its side edges, the flanges extending along the end edges having a width greater than the flanges located along the side edges, the central portion of the pan having a plurality of openings.

In witness whereof I have hereunto signed my name to this specification.

HARRY WARMAN.